United States Patent
Santan et al.

(10) Patent No.: US 11,086,815 B1
(45) Date of Patent: Aug. 10, 2021

(54) SUPPORTING ACCESS TO ACCELERATORS ON A PROGRAMMABLE INTEGRATED CIRCUIT BY MULTIPLE HOST PROCESSES

(71) Applicant: Xilinx, Inc., San Jose, CA (US)

(72) Inventors: Sonal Santan, San Jose, CA (US); Soren T. Soe, San Jose, CA (US); Cheng Zhen, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 4 days.

(21) Appl. No.: 16/384,624

(22) Filed: Apr. 15, 2019

(51) Int. Cl.
*G06F 15/78* (2006.01)

(52) U.S. Cl.
CPC ........ *G06F 15/781* (2013.01); *G06F 15/7867* (2013.01)

(58) Field of Classification Search
CPC .......................... G06F 15/7867; G06F 15/7871
USPC .......................................................... 712/37
See application file for complete search history.

(56) References Cited

U.S. PATENT DOCUMENTS

| | | | | |
|---|---|---|---|---|
| 6,539,438 | B1 * | 3/2003 | Ledzius | G06F 15/7867 710/16 |
| 7,870,364 | B2 * | 1/2011 | Bang | G06F 15/7867 712/15 |
| 9,483,282 | B1 * | 11/2016 | Vandervennet | G06F 15/7871 |
| 2005/0102573 | A1 * | 5/2005 | Sun | G06F 15/7842 714/30 |
| 2012/0221833 | A1 * | 8/2012 | Allaire | G06F 1/3287 712/37 |
| 2013/0346985 | A1 * | 12/2013 | Nightingale | G06F 15/7871 718/102 |
| 2015/0248441 | A1 * | 9/2015 | Takagi | G06F 9/448 707/638 |
| 2016/0259756 | A1 * | 9/2016 | Ahmad | G06F 12/1425 |
| 2017/0195173 | A1 * | 7/2017 | Izenberg | G06F 9/45558 |
| 2017/0317679 | A1 * | 11/2017 | Suh | G06F 9/38 |
| 2018/0143860 | A1 * | 5/2018 | Dasu | G06F 15/7867 |
| 2018/0260257 | A1 * | 9/2018 | Okada | G06F 9/524 |
| 2018/0357098 | A1 * | 12/2018 | Dube | G06F 9/5005 |

(Continued)

OTHER PUBLICATIONS

Xilinx, Inc., "Xilinx Runtime (XRT) Core Library," Xilinx Runtime, v. 2018.3, [retrieved Feb. 28, 2019], retrieved from the Internet: <https://xilinx.github.io/XRT/2018.3/html/xclhal2.main.html>, 27 pages, San Jose, CA USA.

*Primary Examiner* — Shawn Doman
(74) *Attorney, Agent, or Firm* — Kevin T. Cuenot

(57) ABSTRACT

Supporting multiple clients on a single programmable integrated circuit (IC) can include implementing a first image within the programmable IC in response to a first request for processing to be performed by the programmable IC, wherein the request is from a first process executing in a host data processing system coupled to the programmable IC, receiving, using a processor of the host data processing system, a second request for processing to be performed on the programmable IC from a second and different process executing in the host data processing system while the programmable IC still implements the first image, comparing, using the processor, a second image specified by the second request to the first image, and, in response to determining that the second image matches the first image based on the comparing, granting, using the processor, the second request for processing to be performed by the programmable IC.

20 Claims, 8 Drawing Sheets

(56) References Cited

U.S. PATENT DOCUMENTS

| | | | |
|---|---|---|---|
| 2019/0042313 A1* | 2/2019 | Kegel | G06F 9/5011 |
| 2019/0146829 A1* | 5/2019 | Cheng | G06F 9/5016 |
| | | | 718/108 |
| 2019/0163447 A1* | 5/2019 | Carey | G06F 11/34 |
| 2020/0073721 A1* | 3/2020 | Veale | G06F 9/5055 |
| 2020/0174840 A1* | 6/2020 | Zhao | G06F 9/5027 |

* cited by examiner

600

Implement a first image within programmable IC in response to a first request for processing to be performed by the programmable IC, wherein the first request is from a first process executing in a host data processing system coupled to the programmable IC
602

Receive a second request for processing to be performed on the programmable IC from a second and different process executing in the host data processing system while the programmable IC still implements the first image
604

Compare a second image specified by the second request to the first image
606

In response to determining that the second image matches the first image based on the comparing, granting the second request for processing to be performed by the programmable IC
608

FIG. 6

SUPPORTING ACCESS TO ACCELERATORS ON A PROGRAMMABLE INTEGRATED CIRCUIT BY MULTIPLE HOST PROCESSES

TECHNICAL FIELD

This disclosure relates to integrated circuits (ICs) and, more particularly, to supporting multiple clients on a single programmable IC.

BACKGROUND

A heterogeneous computing platform (HCP) refers to a type of data processing system that includes a host processor and one or more other different processing devices. The host processor is typically implemented as a central processing unit (CPU). The host processor is coupled to the other processing devices through interface circuitry. The other processing devices are architecturally different from the host processor. Still, the processing devices are capable of performing jobs offloaded from the host processor and making results of the jobs available to the host processor.

In some cases, the processing devices are adapted to execute program code. Such processing devices typically have an instruction set architecture that differs from the host processor. Examples of these other processing devices include, but are not limited to, graphics processing unit(s) (GPUs), digital signal processor(s) (DSPs), and so forth.

In other cases, the processing devices that perform jobs offloaded from the host processor include devices adapted to hardware accelerate program code. These processing devices include circuitry that is capable of performing the offloaded job in hardware. The circuitry operates in a manner that is functionally equivalent to execution of program code were the job not offloaded and instead performed by the host processor. Examples of processing devices capable of hardware acceleration include programmable integrated circuits (ICs) such as field programmable gate arrays (FPGAs), partially programmable ICs, application specific ICs (ASICs), and so forth. Appreciably, an HCP may include a combination of processing devices where one or more processing devices are adapted to execute program code and one or more other processing devices are adapted to hardware accelerate program code.

Implementing functions in hardware that would otherwise be implemented as executable program code may provide a variety of benefits such as faster operation, reduced power consumption, redundancy, etc. Despite the fact that implementing program code in hardware provides benefits that may or may not include faster operation, the use of hardware or circuitry to perform jobs that would otherwise be implemented as executable program code by a processor is referred to as "hardware acceleration".

SUMMARY

A method includes implementing a first image within a programmable integrated circuit (IC) in response to a first request for processing to be performed by the programmable IC, wherein the request is from a first process executing in a host data processing system coupled to the programmable IC, receiving, using a processor of the host data processing system, a second request for processing to be performed on the programmable IC from a second and different process executing in the host data processing system while the programmable IC still implements the first image, comparing, using the processor, a second image specified by the second request to the first image, and, in response to determining that the second image matches the first image based on the comparing, granting, using the processor, the second request for processing to be performed by the programmable IC.

A system includes a processor configured to initiate operations. The operations include implementing a first image within a programmable IC in response to a first request for processing to be performed by the programmable IC, wherein the request is from a first process executed by the processor, receiving a second request for processing to be performed on the programmable IC from a second and different process executed by the processor while the programmable IC still implements the first image, comparing a second image specified by the second request to the first image, and, in response to determining that the second image matches the first image based on the comparing, granting the second request for processing to be performed by the programmable IC.

A computer program product includes a computer readable storage medium having program code stored thereon. The program code is executable by a processor to perform operations. The operations include implementing a first image within a programmable IC in response to a first request for processing to be performed by the programmable IC, wherein the request is from a first process executing in a host data processing system coupled to the programmable IC, receiving a second request for processing to be performed on the programmable IC from a second and different process executing in the host data processing system while the programmable IC still implements the first image, comparing a second image specified by the second request to the first image, and, in response to determining that the second image matches the first image based on the comparing, granting the second request for processing to be performed by the programmable IC.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 6 illustrates another example method of supporting multiple clients on a single programmable IC.

DETAILED DESCRIPTION

Figure 1:
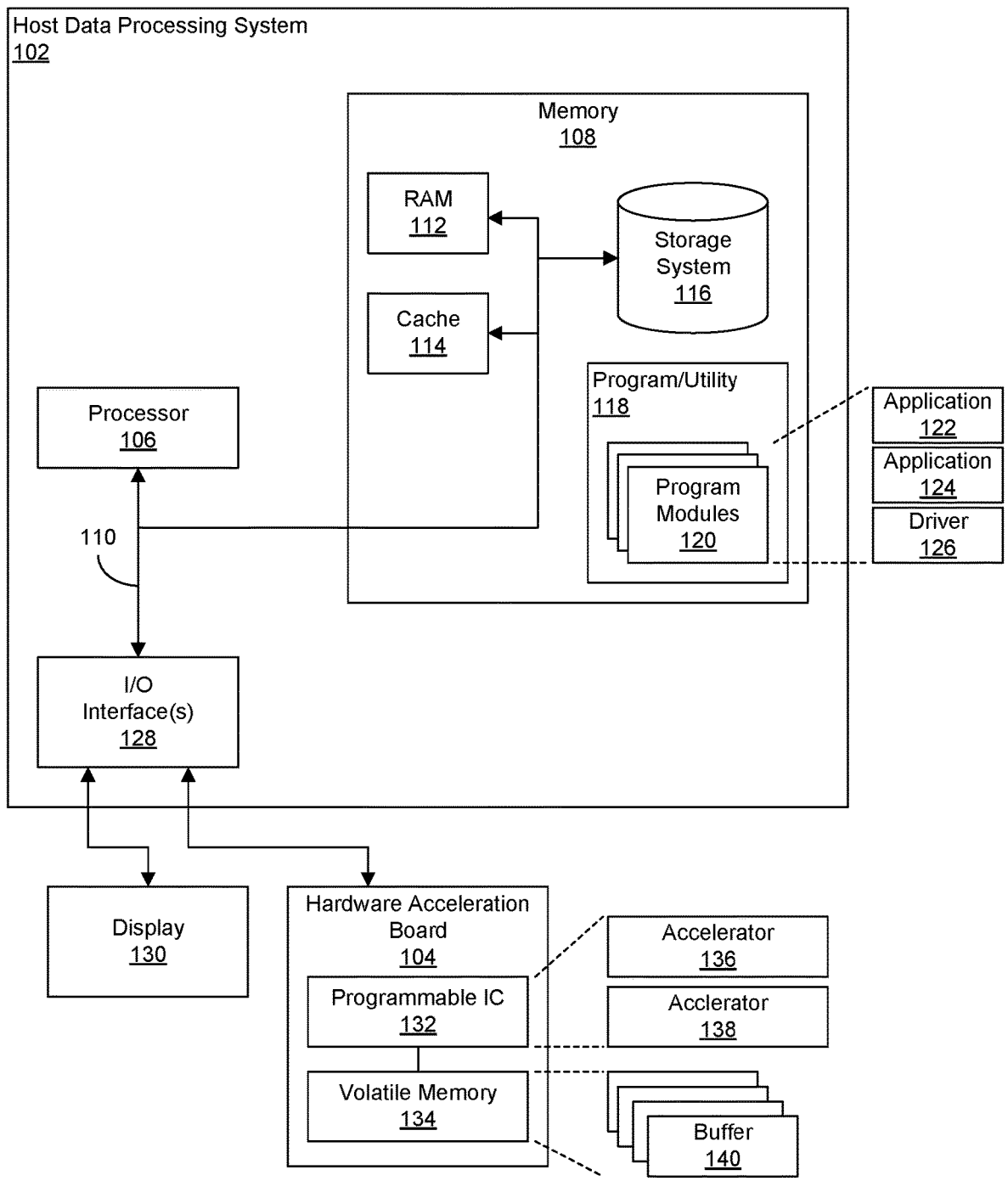
FIG. 1 illustrates an example of a heterogeneous computing platform.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to supporting multiple clients on a single programmable IC. A heterogeneous computing platform (HCP) may include a host data processing system and a hardware acceleration board coupled to the host data processing system through a communication bus. The hardware acceleration board may include a single programmable IC. An example of a programmable IC is a field programmable gate array (FPGA).

In general, the programmable IC may be loaded with only one image at a time. The term "image" is used within this disclosure synonymously with the term "configuration bitstream". The image, or configuration bitstream, may specify one or more accelerators that may be implemented using the programmable circuitry available on the programmable IC. The accelerator(s) are physically implemented in the programmable IC as a consequence of loading the image therein. In conventional systems, only one client (e.g., one process or application executing in the host data processing system) is allowed to access the programmable IC at a time. For a second and different client to access the programmable IC, the programmable IC must be idle in that the no other client, including the first client, is using the programmable IC.

In accordance with the inventive arrangements described within this disclosure, an HCP is provided that supports multiple, different clients accessing the programmable IC. The host data processing system is configured to execute a suitable driver that manages access to the hardware acceleration board and the programmable IC implemented thereon by multiple, different clients. As such, two or more different applications and/or processes may access the programmable IC using time-division multiplexing. In this approach, the host data processing system is capable of accepting and scheduling requests for processing to be performed by the programmable IC even in cases where the programmable IC is not idle.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of an HCP 100. HCP 100 may include a host data processing system (host system) 102 and a hardware acceleration board 104. HCP 100 is only one example implementation of a computing environment that may be used with a hardware acceleration board. In this regard, HCP 100 may be used in a standalone capacity, as a bare metal server, as part of a computing cluster, or as a cloud computing node within a cloud computing environment. FIG. 1 is not intended to suggest any limitation as to the scope of use or functionality of the examples described herein. HCP 100 is an example of a system and/or computer hardware that is capable of performing the various operations described within this disclosure. HCP 100, for example, is capable of managing the loading of one or more different images into hardware acceleration board 104, managing access of different clients to hardware acceleration board 104, and/or resetting hardware acceleration board 104.

Host system 102 is operational with numerous other general-purpose or special-purpose computing system environments or configurations. Examples of computing systems, environments, and/or configurations that may be suitable for use with host system 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As illustrated, host system 102 is shown in the form of a computing device, e.g., a computer or server. The components of host system 102 may include, but are not limited to, one or more processors 106 (e.g., central processing units), a memory 108, and a bus 110 that couples various system components including memory 108 to processor 106. Processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Host system 102 typically includes a variety of computer system readable media. Such media may be any available media that is accessible by host system 102 and may include any combination of volatile media, non-volatile media, removable media, and/or non-removable media.

Memory 108 may include computer system readable media in the form of volatile memory, such as random-access memory (RAM) 112 and/or cache memory 114. Host system 102 may also include other removable/non-removable, volatile/non-volatile computer system storage media. By way of example, storage system 116 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. As will be further depicted and described below, memory 108 may include at least one computer program product having a set (e.g., at least one) of program modules (e.g., program code) that are configured to carry out the functions and/or operations described within this disclosure.

Program/utility 118, having a set (at least one) of program modules 120, may be stored in memory 108 by way of example, and not limitation, as well as an operating system, one or more application programs, other program modules, and program data. Program modules 120 generally carry out the functions and/or methodologies of embodiments of the invention as described herein. For example, program modules 120 may include one or more applications 122, 124 and a driver 126 configured to control and/or interact with hardware acceleration board 104. Driver 126 may be kernel-level driver. In another example, driver 126 can be implemented as a daemon running in the user space. Applications 122 and 124 may execute in the "user space" of host system 102.

For example, driver 126 is capable of performing the various operations described within this disclosure including, but not limited to, supporting access of multiple clients to hardware acceleration board 104 and programmable IC 132. Program/utility 118 is executable by processor 106. Program/utility 118 and any data items used, generated, and/or operated upon by processor 106 are functional data structures that impart functionality when employed by processor 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host system 102 may include one or more Input/Output (I/O) interfaces 128 communicatively linked to bus 110. I/O interface(s) 128 allow host system 102 to communicate with external devices, couple to external devices that allow user(s) to interact with host system 102, couple to external devices that allow host system 102 to communicate with other computing devices, and the like. For example, host system 102 may be communicatively linked to a display 130 and to hardware acceleration board 104 through I/O interface(s) 128. Host system 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which host system 102 communicates with hardware acceleration board 104 is a PCIe adapter. Hardware acceleration board 104 may be implemented as a circuit board, e.g., a card, that couples to host system 102. Hardware acceleration board 104 may, for example, be inserted into a card slot, e.g., an available bus and/or PCIe slot of host system 102. Hardware acceleration board 104 may include programmable IC 132, which may be referred to herein from time-to-time as a "target IC". In one example, programmable IC 132 has an architecture the same as or similar to the architecture described in connection with FIG. 7. Hardware acceleration board 104 also includes volatile memory 134 coupled to programmable IC 132. Volatile memory 134 may be implemented as a RAM and is considered a "local memory" of programmable IC 132, whereas memory 108, being within host system 102, is not considered local to programmable IC 132. In some implementations, volatile memory 134 may include multiple gigabytes of RAM, e.g., 64 GB of RAM. Hardware acceleration board 104 may also include non-volatile platform memory such as flash memory (not shown).

In the example of FIG. 1, the operating system executed by host system 102 is a multi-processing operating system that is capable of executing multiple different processes, e.g., tasks, concurrently. Each different process is capable of running in a different virtual address space. Processes may interact with one another through secure, kernel managed mechanisms. As such, each process has its own rights and responsibilities. If one process crashes, the crashed process does not affect any other processes executing in host system 102. An example of such an operating system is any of a variety of the Linux family of operating systems. For purposes of illustration, each of the applications 122 and 124 illustrated in FIG. 1 may be executed in a different process by host system 102. In this regard, each different application executing in host system 102 may be considered a process. Further, each different process or application (e.g., applications 122 and 124) may be considered a different "client" of hardware acceleration board 104 if such applications and/or processes are capable of issuing requests to driver 126 for job(s) to be performed by hardware acceleration board 104.

Driver 126 is capable of managing access of applications 122, 124 to hardware acceleration board 104. For purposes of illustration, programmable IC 132 has been loaded with an image, e.g., a configuration bitstream. The image, when loaded into programmable IC 132 physically implements circuitry that is specified by the image (e.g., a circuit design) within programmable IC 132. In the example of FIG. 1, the image loaded into programmable IC 132 implements two different accelerators 136, 138. As an example, accelerator 136 may be configured to perform a compression operation such as "Gzip". Accelerator 138 may be configured to perform video encoding. A given image may implement fewer or more accelerators than shown. Only one image may be implemented or loaded in programmable IC 132 at a time.

In the example of FIG. 1, driver 126 is capable of controlling access of applications 122, 124 to programmable IC 132 so that each of applications 122 and 124 is able to access programmable IC 132 concurrently. As an example, driver 126 is capable of implementing time-division multiplexing to grant different applications (e.g., processes) the ability to offload jobs to programmable IC 132 on a first-come-first-serve basis. In another aspect, driver 126 may grant processes access to programmable IC 132 in a round-robin fashion. In any case, driver 126 is capable of using a time-multiplexed approach to allow processes access to programmable IC 132.

For purposes of illustration, each request from a process submitted to driver 126 corresponds to a job to be performed by programmable IC 132. A job is a discrete unit of work to be performed by an accelerator in programmable IC 132. A job may represent a task or operation offloaded from host system 102. In the case where the task or operation is subdivided into smaller tasks and/or operations (e.g., subtasks or sub-operations as the case may be), each subtask or sub-operation may be referred to as a job and specified by a request. Driver 126 is capable of intermingling requests (and jobs) from the different processes attempting to access programmable IC 132 concurrently.

For example, driver 126 may receive multiple requests to access programmable IC 132 and, in particular, accelerator 136 at or about a same time. The requests may be received by driver 126 from applications 122 and 124 as each application executes concurrently in a different process in host system 102. Driver 126 is capable of accepting both requests and queuing the requests, under certain conditions to be described herein. Driver 126 is capable of processing the requests in the order received so that the job to be offloaded to accelerator 136 from each request from applications 122, 124 is performed. While accelerator 136 is capable of performing only one job corresponding to one request at a time, both requests may be granted and queued and ultimately performed by programmable IC 132.

In another example, since the image implemented in programmable IC 132 implements more than one accelerator, driver 126 is capable of allowing one process (e.g., application 122) to access accelerator 136, while another process (e.g., application 124) accesses accelerator 138 simultaneously or at least in an overlapped manner. The requests issued by the processes may specify a particular image and also a particular accelerator in the image. In this manner, driver 126 is capable of managing access by different processes to accelerators 136 and 138 as implemented in programmable IC 132.

An aspect of supporting multiple client access to programmable IC 132 is supporting the use of multiple different buffers 140 within volatile memory 134. For example, driver 126 is capable of creating a buffer 140 within volatile memory 134 for each different process that has at least one granted request to access programmable IC 132, whether queued in host system 102 or currently being operated on within programmable IC 132. Each of buffers 140, for example, corresponds to a different process and occupies a mutually exclusive region of volatile memory 134. Buffers 140 do not overlap. Each of buffers 140 may be defined and allocated by assigning a base address and range. Driver 126 is capable of maintaining a mapping of buffers 140 to processes. Driver 126, for example, to ensure that buffers do not overlap, is capable of serializing requests for buffers in volatile memory 134.

By supporting allocation of buffers 140 in local memory of programmable IC 132 corresponding to different processes executing in host system 102 (e.g., supporting multi-client access to programmable IC 132), driver 126 is capable of improving runtime efficiency so that input data provided to programmable IC 132 and output data generated by programmable IC 132 corresponding to multiple different processes may be moved between host system 102 and hardware acceleration board 104 without having to wait for earlier requests performed by accelerator 136 and/or accelerator 138 to complete. In effect, data may be moved to and from programmable IC 132 corresponding to different requests (e.g., from different processes) while programmable IC 132 services other requests.

Conventional HCPs do not allow or support multiple, concurrent client access and/or use of a programmable IC and/or a hardware acceleration board having a single programmable IC. In conventional HCPs, the host system only allows a given process to access the programmable IC when the programmable IC is idle (e.g., unused). The host system provides input data corresponding to a given process to the programmable IC to be operated on and then receives the output data generated by the programmable IC. When the programmable IC is determined to be idle, the host system may then allow another process to access the programmable IC, e.g., provide input data to the programmable IC and then receive the output data generated by the programmable IC. For example, a conventional HCP, being unable to support multiple client access to the hardware acceleration board and/or the programmable IC, upon receiving a plurality of requests at or about the same time, would grant the first received request to perform a job, but then deny the subsequently received requests. Queuing of requests is not supported or performed by conventional systems. As such, the application with the denied request must then continually poll the driver to determine when the programmable IC is available (e.g., idle), which wastes processing cycles of processor 106.

Driver 126 is further capable of arbitrating when different images requested by processes may be loaded into programmable IC 132. In an example implementation, application 122 executing in host system 102 is capable of acquiring a reference, e.g., access, to accelerator 136 implemented by an image loaded in programmable IC 132. Driver 126 counts the access, or reference, by incrementing a count in response to application 122 acquiring a first access to any accelerator of the currently loaded image in programmable IC 132. Any subsequently granted accesses to other accelerators implemented by the same image and for the same process (e.g., application 122) are recorded by driver 126, but do not increase the count. As such, the count indicates the number of processes that are using or accessing programmable IC 132 at any given time. When a process such as application 122 releases access to the last accelerator implemented in programmable IC 132, driver 126 decrements the count. Once the count for the image currently implemented in programmable IC 132 reaches zero, any process (e.g., application 122 and/or 124 or another process) can load a different image into programmable IC 132.

Figure 2:
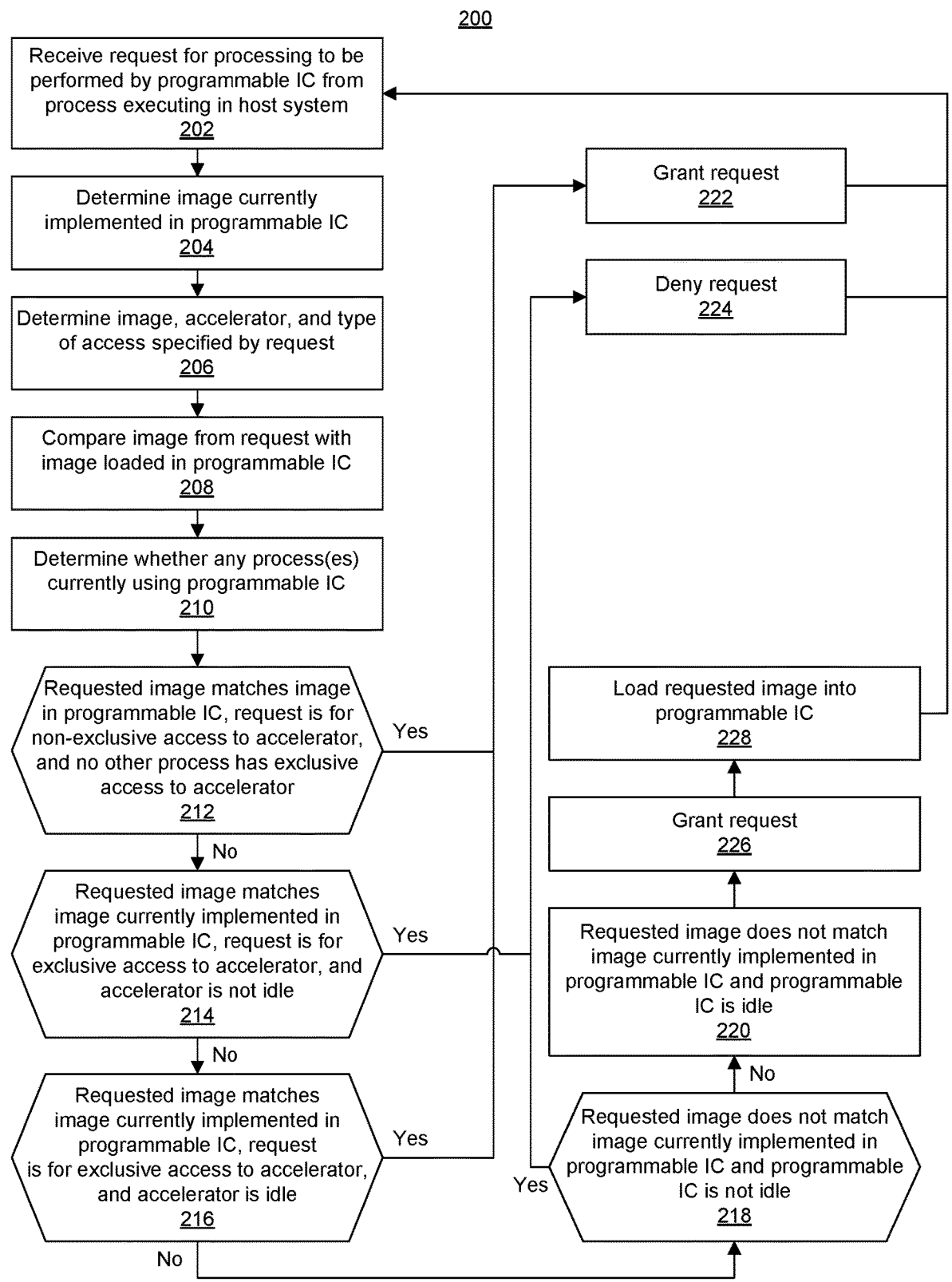
FIG. 2 illustrates an example method of supporting multiple clients on a single programmable integrated circuit (IC).

FIG. 2 illustrates an example method 200 of supporting multiple clients on a single programmable IC. Method 200 may be performed by host system 102 described in connection with FIG. 1. More particularly, method 200 may be performed by driver 126 executing within host system 102. Method 200 illustrates a simplified method of operation for the driver and illustrates the various states that are checked in handling requests from processes.

In general, the driver is capable of granting requests for offloading jobs to the programmable IC under certain conditions. In terms of allowing a plurality of different clients to access the programmable IC concurrently, each client of the plurality of different clients must request access to a same image. Further, in cases where the clients are attempting to access a same accelerator of the image, each of the plurality of different clients must request non-exclusive access to that accelerator.

In block 202, the driver receives a request for processing to be performed by the programmable IC from a process executing in the host system. As discussed, the process executing in the host system may be an application executed by the host system. The host system is capable of executing a plurality of different processes where execution of different ones of the processes overlap in time, referred to herein as "concurrent execution".

The request received by the driver from the process may include a number of different data items or arguments. In one example, the request specifies a particular image that should be loaded into the programmable IC. The image specified by the request, when loaded into the programmable IC, implements an accelerator or accelerators that is/are needed by the process. The process effectively offloads a job or "work" to the programmable IC. In an example implementation, each image may be uniquely identified by an image identifier. In one aspect, the image identifier may be a Universal Unique Identifier (UUID), though bit sizes other than 128-bits may be used. The request may also specify a particular accelerator of the specified image using an accelerator index that uniquely specifies an accelerator of the image. For example, in cases where an image implements a plurality of different accelerators within the programmable IC, the request may specify a particular one of the accelerators, via the accelerator index, to be used in performing the job offloaded from host system 102 in consequence of the request. Even in cases where an image implements a single accelerator, the request still may specify the accelerator.

In another aspect, the request may also specify a type of access to the accelerator that is desired. The type of access may be exclusive or non-exclusive. As defined herein, "exclusive" access to an accelerator means that the requesting process, if granted exclusive access, is the only process permitted to use the specified accelerator and that requests by each other process to access the same accelerator are rejected until the requesting process has completed using the accelerator and the accelerator is idle. As defined herein, "non-exclusive" access to an accelerator means that the accelerator may be shared among multiple, different processes, e.g., where processes are able to offload jobs to the accelerator on a first-come-first-serve basis.

In block 204, the driver determines the image currently implemented in the programmable IC. The driver, for example, is capable of storing a record, e.g., a UUID, for the image that is loaded into the target IC at or about the time that the image is loaded. Since the driver is responsible for loading images into the programmable IC, the driver is capable of creating a record in memory indicating the image that is loaded into the programmable IC at or about the time of loading. As such, the driver is capable of tracking which image is loaded in the target IC, managing the number of clients (e.g., processes) on the target IC, and tracking the number of such clients using and/or accessing the target IC.

In an example implementation, the driver tracks which processes have submitted a request for the image (and/or a particular accelerator of the image) implemented in the programmable IC. The driver maintains a count, referred to herein as the "process count", of the number of processes accessing the programmable IC at any given time. The driver is further capable of tracking when a process is finished using or accessing the programmable IC (e.g., the image therein and/or any requested accelerator). The process, for example, upon completing use of an accelerator, submits a release to the driver corresponding to the earlier submitted request. In response to receiving the release from the process, the driver is capable of determining whether the process that submitted the release is still using any accelerators of the programmable IC. In response to determining that the process is no longer using any accelerators of the programmable IC, the driver decrements the process count.

For example, the driver stores the image identifier (e.g., the UUID) of the image currently implemented by the programmable IC and a number of users (e.g., processes) currently using the programmable IC. The driver is capable of determining whether the programmable IC is idle based on the process count. When the process is zero, the programmable IC is considered idle and, if required, a new image may be loaded therein. The term "idle" means that no process has requested access to an accelerator of the programmable IC. The driver is also capable of maintaining a list of processes that have been granted access to an accelerator in the programmable IC and/or the type of access that was granted. In this regard, the driver is capable of maintaining a process count of the number of processes that are using the programmable IC as well as, for each accelerator, a count, referred to as an accelerator count, indicating the number of processes that are using or accessing a particular accelerator.

In block 206, the driver is capable of determining the image, the accelerator, and a type of access specified by the request received in block 202. In block 208, the driver is capable of comparing the image from the request with the image currently loaded in the programmable IC. For example, the driver is capable of comparing the image identifier specified by the request with the image identifier of the image currently implemented in the programmable IC. In general, the driver is capable of determining whether a process is requesting use of the same image already implemented within the programmable IC or requesting use of an image that is different from the image already implemented within the programmable IC. In block 210, the driver is capable of determining whether there are any processes currently using the programmable IC, e.g., whether the programmable IC is idle, based on the process count.

Beginning in block 212 and continuing through block 218, the driver is capable of determining whether to grant the request received in block 202 or deny the request received in block 202 based on the requests and releases received from the process(es) as tracked and maintained by the driver and/or the various counts described herein.

In block 212, in response to determining that the requested image matches the image currently implemented in the programmable IC, that the request is for non-exclusive access to the accelerator specified by the request, and that no other process has exclusive access to the specified accelerator, method 200 continues to block 222. In block 222, the driver grants the request. If the conditions specified in block 212 are not true, method 200 continues to block 214.

In block 214, in response to determining that the requested image matches the image currently implemented in the programmable IC, the request is for exclusive access to the accelerator specified by the request, and the accelerator specified by the request is not idle (has an accelerator count of one or more), method 200 continues to block 224. In block 224, the driver denies the request. The request denial may be implemented as a Portable Operating System Interface (POSIX) error code that the driver provides back to the requesting application or process. If the conditions specified in block 214 are not true, method 200 continues to block 216.

In block 216, in response to determining that the requested image matches the image currently implemented in the programmable IC, the request is for exclusive access to the accelerator specified by the request, and the accelerator specified by the request that is implemented in the programmable IC has no pending requests (e.g., has an accelerator count of zero), method 200 continues to block 222. In block 222, the driver grants the request. In granting the request, the driver creates a record of the exclusive access granted to the accelerator in response to the request. If the conditions specified in block 216 are not true, method 200 continues to block 218.

In block 218, in response to determining that the requested image does not match the image currently implemented in the programmable IC and that the programmable IC is not idle (e.g., has a process count of one or more), method 200 continues to block 224. For example, the driver determines that one or more processes have been granted access to one or more accelerators implemented by the image currently loaded in the programmable IC. Accordingly, in block 224, the driver denies the request.

In block 220, the driver determines that the requested image does not match the image currently implemented in the programmable IC and that the programmable IC is idle (e.g., has a process count of zero). For example, the driver determines that no other processes have been granted access to any of the accelerators currently implemented in the programmable IC. Accordingly, method 200 continues to block 226. In block 226, the driver grants the request. In block 228, the driver initiates loading and/or programming of the programmable IC with the image specified by the request (e.g., which is different from the image currently loaded in the programmable IC). After block 228, method 200 continues to block 202 to continue processing.

Figure 3:
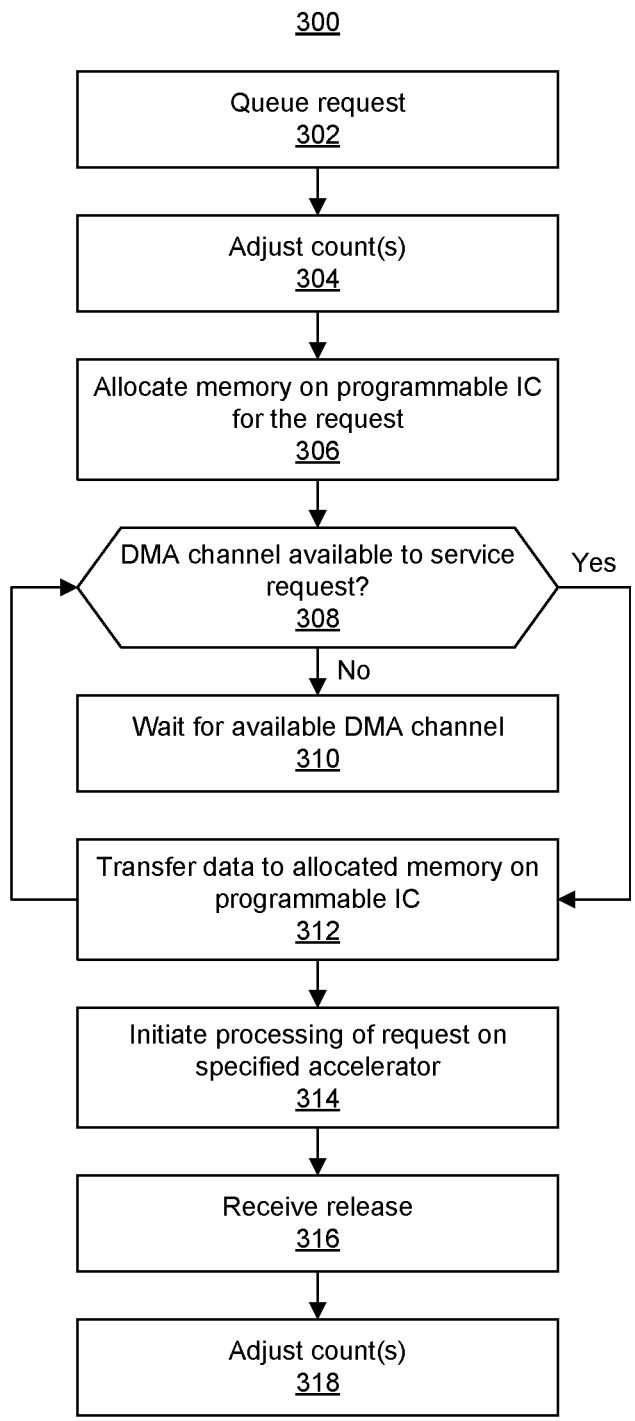
FIG. 3 illustrates another example method of supporting multiple clients on a single programmable IC.

FIG. 3 illustrates another example method 300 of supporting multiple clients on a single programmable IC. Method 300 may be performed by host system 102 described in connection with FIG. 1 and, more particularly, by driver 126 executing within host system 102. Method 300 illustrates an example process of handling requests for work to be performed on the programmable IC that have been granted as described in connection with FIG. 2.

In block 302, the driver cues the request. The driver stores the request in a queue maintained in memory. The driver, for example, is capable of maintaining a queue of requests that have been granted. The driver stores each granted request with an identifier for the particular process that issued the request. As such, within the queue, the driver is capable of correlating requests with processes. Further, the driver is capable of correlating or matching releases with granted requests.

In block 304, the driver is capable of adjusting the process count and/or the accelerator count as needed. For example, the driver determines whether the process that issued the request is already using an accelerator within the programmable IC and whether the process is already using the requested accelerator. In response to determining that the process is already using the programmable IC, but not the requested accelerator (e.g., the process is using another accelerator), the driver does not increment the process count and increments the accelerator count of the requested accelerator. In response to determining that the process is already using the requested accelerator, the driver increments the accelerator count for the requested accelerator and does not increment the process count. In response to determining that the process is not already using the programmable IC, the driver increments both the process count and the accelerator count for the requested accelerator.

In block 306, the driver is capable of allocating memory on the programmable IC for the request. The driver, for example, is capable of allocating a buffer in volatile memory 134, e.g., local memory for the programmable IC, for each process having a granted request stored in the queue. As discussed, the driver is capable of assigning non-overlapping or mutually exclusive regions of volatile memory 134 to each such process. The driver further is capable of maintaining a map of allocated buffers to processes in order to reclaim buffers, write (e.g., send) data to be input to a particular accelerator to a buffer allocated to the process that submitted the request being serviced by the accelerator, and read (e.g., retrieve) results output from an accelerator from a buffer allocated to the process that submitted the request that was serviced by the accelerator.

In block 308, the driver determines whether a direct memory access (DMA) channel on the programmable IC is available for servicing the request. In one aspect, the programmable IC includes infrastructure circuitry that uses multiple DMA channels to provide data received from the host system to the appropriate accelerator (to the buffer corresponding to the accelerator) and to provide data generated by the accelerator(s) (in the buffer(s)) to the host system. In one aspect, DMA channel status may be tracked by the driver. For example, the driver is capable of tracking the availability of DMA channels on the programmable IC based on previous data transfers and the completion thereof. In response to determining that a DMA channel is available, method 300 continues to block 312. In response to determining that a DMA channel is not available, method 300 continues to block 310. In block 310, the driver waits for a DMA channel in the programmable IC to become available. Method 300 may loop back to block 308 to continue checking for availability of a DMA channel within the programmable IC for servicing the queued request.

In block 312, the driver transfers data to the buffer in the local memory of the programmable IC that is allocated to the process that submitted the queued request now being serviced. The driver, for example, is capable of initiating a DMA transfer of the data to be operated on by the accelerator specified by the request using the available DMA channel. Once the driver transfers data to the buffer, the driver removes the request from the queue.

In block 314, the driver initiates processing of the request on the accelerator specified by the request. Any results generated by the accelerator may be stored in the allocated buffer in local memory of the programmable IC and transferred back to the host system via the allocated DMA channel in the programmable IC or another DMA channel that is available and obtained for transferring the resulting data to the host system.

In block 316, the driver receives a release from the process that requested access to the image and/or accelerator. In an aspect, in response to receiving the release, the driver is capable of removing the request from the queue.

In block 318, the driver is capable of adjusting the process count and/or the accelerator count as needed. For example, in response to receiving the release, the driver determines whether the process that issued the release is still using the requested accelerator and any other accelerator in the programmable IC. In response to determining that the process is no longer using any accelerator in the programmable IC, the driver decrements the process count and the accelerator count for the released accelerator. In response to determining that the process is no longer using the released accelerator, but is still using another accelerator in the programmable IC, the driver decrements the accelerator count for the released accelerator and does not decrement the process count. In response to determining that the process is still using the released accelerator (e.g., has other pending requests for the accelerator), the driver does not decrement either the process count or the accelerator count for the released accelerator.

Figure 4:
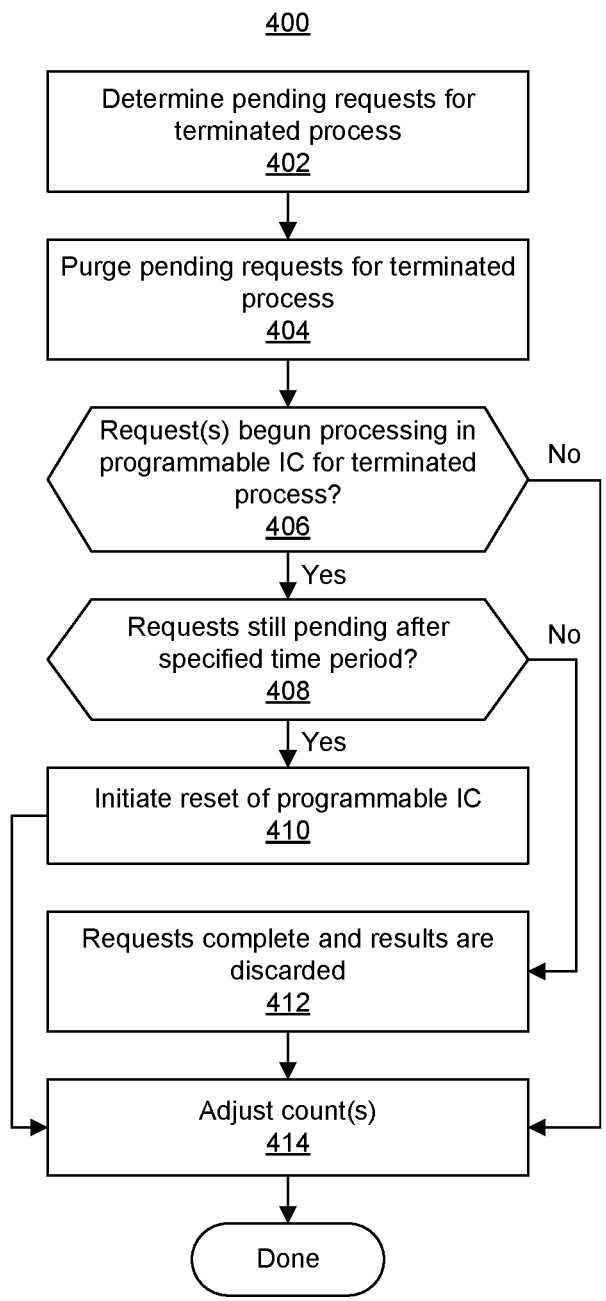
FIG. 4 illustrates another example method of supporting multiple clients on a single programmable IC.

FIG. 4 illustrates another example method 400 of supporting multiple clients on a single programmable IC. Method 400 may be performed by host system 102 described in connection with FIG. 1 and, more particularly, by driver 126 executing within host system 102. Method 400 illustrates an example process for handling requests submitted by a process that has been terminated, e.g., "killed", in the host system. As such, method 400 begins in a state where a process that has submitted one or more requests to the driver for processing to be performed by the programmable IC has been terminated.

In block 402, the driver determines each of the pending requests corresponding to the terminated process. In an example implementation, the driver is capable of identifying each of the requests currently queued that were submitted by the terminated process.

In block 404, the driver is capable of purging each of the pending requests for the terminated process from the queue. For example, the driver is capable of deleting each of the requests identified in block 402 from the queue.

In block 406, the driver is capable of determining whether there are any requests submitted by the terminated process that have already begun processing in the programmable IC. If so, method 400 continues to block 408. If not, method 400 continues to block 414.

In block 408, the driver is capable of determining whether any of the requests that have begun processing in the programmable IC are still pending, or have not finished or completed, after a specified time period. The driver, for example, may allow those requests that have begun processing in the programmable IC a predetermined amount of time to complete. If one or more requests submitted by a terminated process have not completed within the specified time period, method 400 continues to block 410. If the request(s) submitted by the terminated process have completed by the end of the specified time period, method 400 continues to block 412.

In block 410, in the case where the request(s) submitted by the terminated process that have begun processing in the programmable IC have not completed by the expiration of the specified time period, the driver is capable of initiating a reset of the hardware acceleration board. After block 410, method 400 continues to block 414.

In block 412, in the case where the request(s) submitted by the terminated process that have begun processing in the programmable IC have completed by the end of the time period, the driver discards any results that may be received from the programmable IC for the requests since the process that submitted the requests has been terminated.

In block 414, the driver is capable of adjusting the process count and the accelerator count(s). If, for example, the programmable IC is reset, the driver sets all accelerator counts to zero and the process count to zero. If the programmable IC is not reset, the driver decrements the process count and decrements the accelerator count of each accelerator that was being used by the terminated process.

Figure 5A:
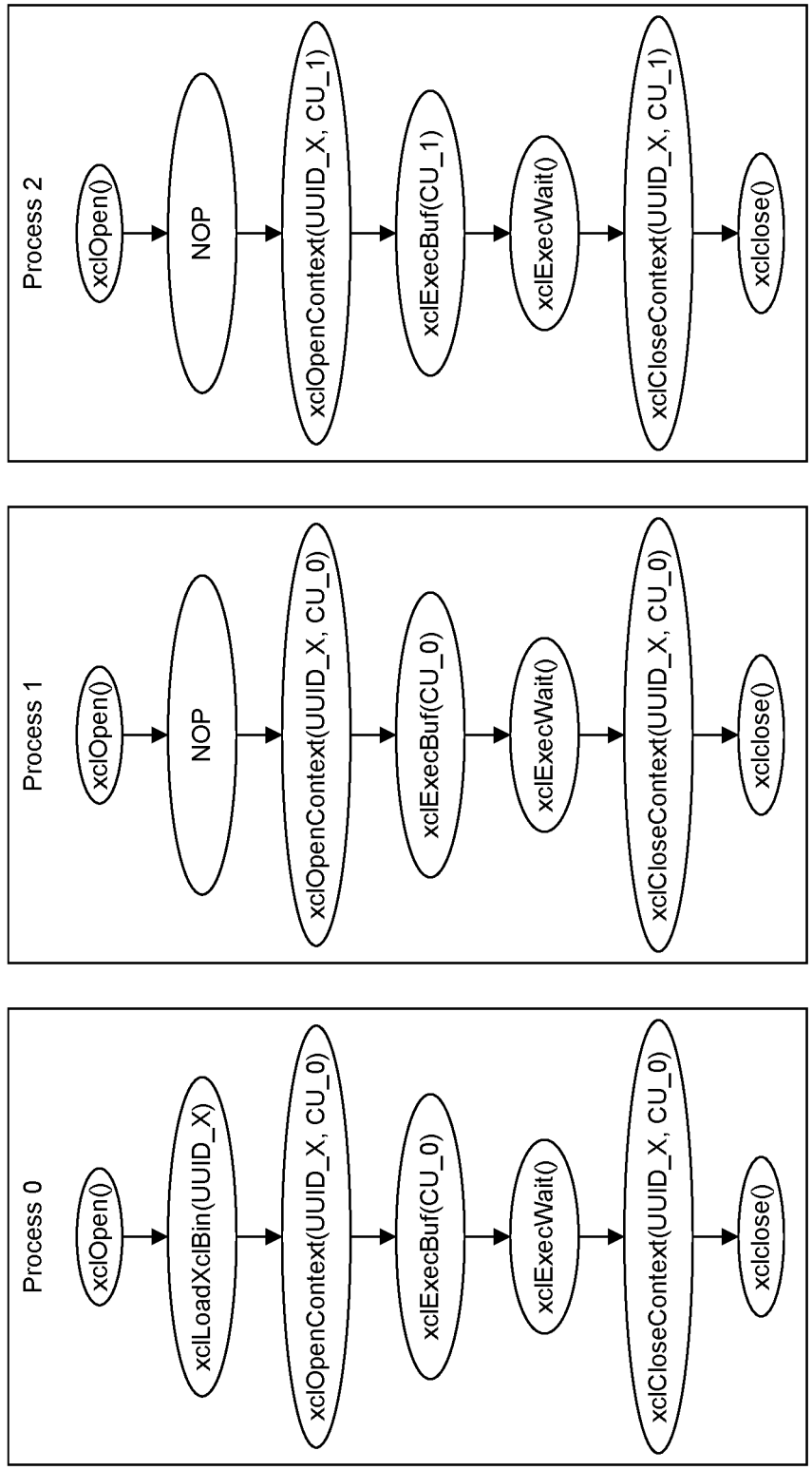
FIGS. 5A and 5B, taken collectively, illustrate operation of a host data processing system in supporting multiple clients on a single programmable IC.
Figure 5B:
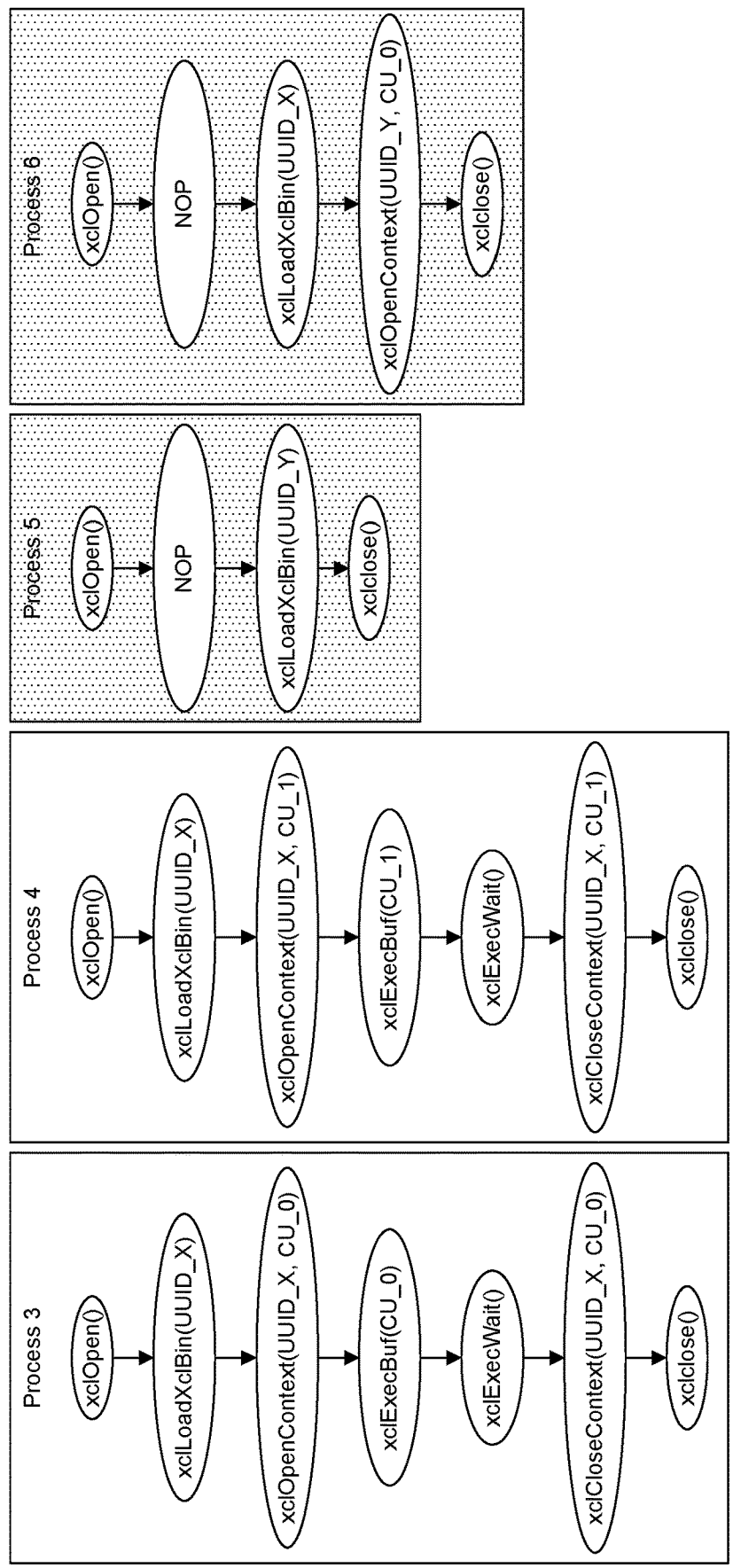

FIGS. 5A and 5B, taken collectively, illustrate operation of a host system in supporting multiple clients on a single programmable IC. FIGS. 5A and 5B, collectively referred to as FIG. 5, illustrate an example in which the driver supports attempted access by processes 0-6 to a programmable IC on a hardware acceleration board.

In one aspect, each image that may be used with the programmable IC is included in a container file referred to as a "xclbin" file. The container file is capable of including or storing one or more configuration bitstreams (e.g., images), information describing the accelerator platform (e.g., the hardware acceleration card), and software such as executable files that may be used or loaded into the programmable IC for execution by a processor or processors contained therein. The container file provides a unified repository for outputs of hardware compilers and software compilers thereby allowing easier integration of embedded processors on the programmable IC. The container file further may include data structures describing the memory topology of the programmable IC and/or hardware acceleration board, accelerator(s) to be instantiated in the programmable IC (e.g., acceleration kernel instantiations), and accelerator connectivity for each accelerator. In one aspect, the container file is identified with the unique identifier (e.g., the image identifier or UUID). In this regard, the image identifier and container identifier may be used interchangeably as a unique identifier of both the image and the container including the image.

FIG. 5 illustrates an example in which multiple different processes are able to share access to the same programmable IC provided that each such process uses the same container file (e.g., image). In the example of FIG. 5, attempts to load different container files via different processes concurrently result in only one process being successful in loading the requested image from the specified container file. The other processes attempting to load different image(s) from different container file(s) receive an error code or denial of their request(s).

As discussed, in the case where two or more processes attempt to access the same accelerator, these processes will acquire access to the accelerator per the driver. The driver may operate on a first-come-first-serve basis. In the example of FIG. 5, each process requesting access to the programmable IC has the same priority.

With the multi-client support described within this disclosure, downloading an image from a container file to the programmable IC does not guarantee a lock on the programmable IC for the process that initiated the download, unlike in other conventional systems. In the multi-client support case, the application executed in the process that downloaded the image to the programmable IC must create an explicit context for each accelerator that the application wants to use. The driver provides an application programming interface (API) through which applications may create contexts and access the programmable IC. The application, for example, is able to create a context on an accelerator with the "xclOpenContext( )" function from the API provided by the driver. The "xclOpenContext( )" function may have an image identifier and an accelerator index. This information can be obtained from the container file itself (e.g., as metadata therein). In one aspect, the "xclOpenContext( )" function causes the driver to increment the process count corresponding to the image identifier. A non-zero process count for an image prevents that image from being unloaded from the programmable IC (e.g., in order to load a different image therein). A zero process count indicates that the image is not used by any process, e.g., is idle, and may be replaced with another image. A corresponding "xclCloseContext( )" function call from the API releases the reference count. An image may only be changed or swapped with another image in the programmable IC in the case where the process count is zero. In the case where an application dies or exits without explicitly releasing the contexts the application had opened before, the driver is capable of automatically releasing the contexts corresponding to the application and decrementing the process count as appropriate.

In the example of FIG. 5, 7 processes (processes 0-6) are attempting to use the programmable IC concurrently. The processes without shading (e.g., processes 0, 1, 2, 3, and 4) are successful. Processes with shading (e.g., processes 5 and 6) are not and fail at different stages of execution with appropriate error codes. In the example of FIG. 5, processes 0, 1, 2, 3, 4, and 6 each is trying to use the image included in the container file indicated by "UUID_X". Process 5 is attempting to use the image from the container file indicated by "UUID_Y". Accordingly, since other processes are using the image corresponding to UUID_X, the request from process 5 is denied. Processes 0, 1, 3, and 6 are trying to use the accelerator indicated by "CU_0" in the image corresponding to "UUID_X". Process 2 is trying to use the accelerator indicated by "CU_1" in the image corresponding to "UUID_X". Since process 6, however, attempts to open a context and, in doing so, references the incorrect image (e.g., UUID_Y instead of UUID_X corresponding to an error condition), process 6 is unsuccessful. The driver denies process 6 access to the programmable IC.

In the example of FIG. 5, there may be "N" processes working together, where exactly one of the N different processes is responsible for loading the image. Once loaded, the process (e.g., process 0) forks multiple other processes (e.g., processes 1 and 2) to use the hardware with the pre-loaded image. In the example of FIG. 5, neither process 1 nor process 2 attempts to load the image. As illustrated, each of process 1 and process 2 includes a No Operation (NOP) in place of the "xclLoadXclBin" instruction to load the image corresponding to UUID_X. As such, processes 1 and 2 rely on another process such as process 0 to have loaded the needed image. In other examples, however, even if process 1 or process 2 had an "xclLoadXclBin(UUID_X)" instruction, the driver is capable of treating such instruction as a NOP in response to determining that the requested image is already loaded in the programmable IC.

In the example of FIG. 5, process 3 and 4 are independent of the N processes (processes 0, 1, and 2). As such, each tries to load the needed image. The processes succeed in obtaining access to the programmable IC since processes 3 and 4 use the same image as processes 0, 1, and 2 which is already loaded in the programmable IC (disregarding exclusive/non-exclusivity in this example). Process 5 may be a process that relies on some other process having loaded the image corresponding to UUID_Y. This other process, however, may have been preempted by process 0. As noted, process 6 illustrates an error within the process itself.

FIG. 6 illustrates another example method 600 of supporting multiple clients on a single programmable IC. Method 600 may be performed by host system 102 described in connection with FIG. 1 and, more particularly, by driver 126 executing within host system 102.

In block 602, a first image is implemented within a programmable integrated circuit in response to a first request for processing to be performed by the programmable IC. The first request is from a first process executing in the host system, which is coupled to the programmable IC. The driver, for example, receives the request and, in response thereto, initiates loading of the first image within the programmable IC.

In block 604, a second request for processing to be performed on the programmable IC is received from a second and different process executing in the host system while the programmable IC still implements the first image. The first request may not be finished processing. The first request, for example, may still be queued in the host system or may be undergoing processing within the programmable IC itself. In another example, the process count for the programmable IC may be non-zero when the second request is received.

In block 606, the second image specified by the second request is compared with the first image. The driver, for example, is capable of comparing the image identifier of the first image (e.g., the image loaded in the programmable IC) with the image identifier of the second image to determine whether the two image identifiers match.

In block 608, in response to determining that the second image matches the first image based on the comparing, the driver is capable of granting the second request for processing to be performed by the programmable IC. As discussed, the driver may queue the second request and perform further processing as described herein so that the programmable IC processes the job specified by the second request.

Figure 7:
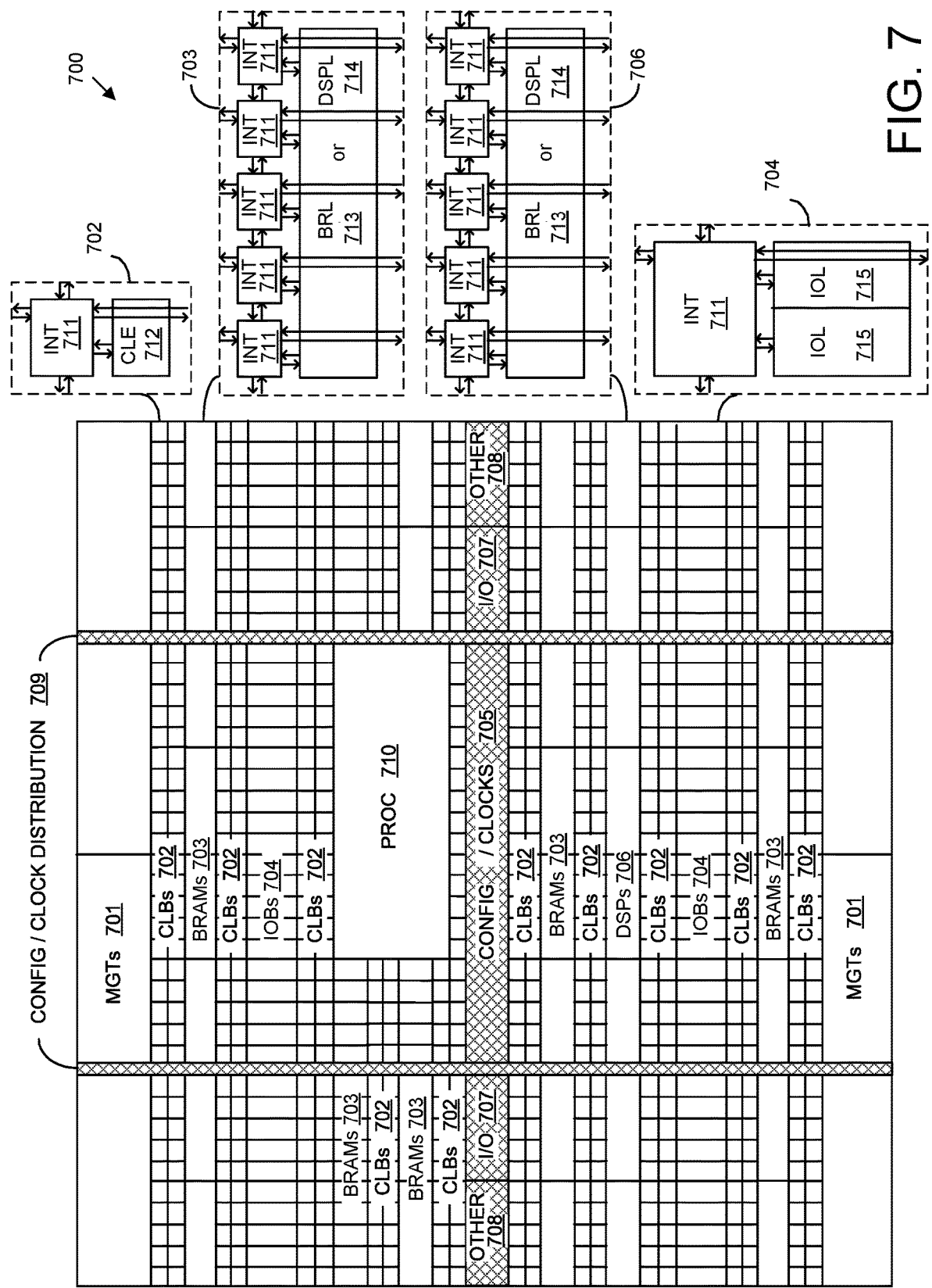
FIG. 7 illustrates an example architecture for an IC.

FIG. 7 illustrates an example architecture 700 for an IC. In one aspect, architecture 700 may be implemented within a programmable IC such as programmable IC 132 of FIG. 1. For example, architecture 700 may be used to implement a field programmable gate array (FPGA). Architecture 700 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at the top of FIG. 7.

For example, a CLB 702 may include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An 10B 704 may include, for example, two instances of an I/O logic element (IOL) 715 in addition to one instance of an INT 711. The actual I/O pads connected to IOL 715 may not be confined to the area of IOL 715.

In the example pictured in FIG. 7, a columnar area near the center of the die, e.g., formed of regions 705, 707, and 708, may be used for configuration, clock, and other control logic. Horizontal areas 709 extending from this column may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft processor" in that the various blocks of programmable circuitry may be used to form a processor that can execute program code as is the case with PROC 710.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 7 that are external to PROC 710 such as CLBs 702 and BRAMs 703 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." As noted, a configuration bitstream is also referred to herein as an "image". In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 710 or a soft processor. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 7 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations.

A system as described herein in connection with FIG. 1, for example, is capable of controlling which configuration bitstreams are loaded into the IC, when such configuration bitstreams are loaded into the IC, and which processes and requests submitted by such processes are provided to the IC for processing.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method include implementing a first image within a programmable IC in response to a first request for processing to be performed by the programmable IC, wherein the request is from a first process executing in a host data processing system coupled to the programmable IC, receiving, using a processor of the host data processing system, a second request for processing to be performed on the programmable IC from a second and different process executing in the host data processing system while the programmable IC still implements the first image, comparing, using the processor, a second image specified by the second request to the first image, and, in response to determining that the second image matches the first image based on the comparing, granting, using the processor, the second request for processing to be performed by the programmable IC.

In an aspect, the second request specifies a type of access. Accordingly, the method includes performing the granting in response to determining that the type of access is non-exclusive.

In another aspect, the second request specifies a type of access. Accordingly, the method includes performing the granting in response to determining that the type of access is exclusive and an accelerator implemented in the programmable IC and specified by the second request is idle.

In another aspect, the method includes receiving a third request for processing to be performed on the programmable IC from a third and different process executing in the host data processing system while the programmable IC still implements the first image, comparing a third image specified by the third request to the first image, and, in response to determining that the third image does not match the first image based on the comparing and that the programmable IC is not idle, rejecting the third request for processing to be performed by the programmable IC.

In another aspect, the method includes detecting that the second process has been terminated and, in response to the detecting, purging each request associated with the second process that has been queued in the host data processing system and not yet submitted to the programmable IC.

In another aspect, the method includes discarding results received from the programmable IC for any request associated with the second process.

In another aspect, the method includes, in response to determining that a request submitted by the second process has not finished after expiration of a specified time period, initiating reset of the programmable IC.

In another aspect, the method includes allocating a first region of RAM local to the programmable IC to the first process and allocating a second region of the RAM local to the programmable IC to the second process. The first region and the second region are allocated for an overlapping amount of time and are mutually exclusive regions in the local memory.

In another aspect, the method includes determining that a direct memory access channel on the programmable IC is available, allocating the available direct memory access channel to the second process, and transferring data for use by the second process to a region of RAM local to the programmable IC using the available direct memory access channel.

A system includes a processor configured to initiate operations. The operations include implementing a first image within a programmable IC in response to a first request for processing to be performed by the programmable IC, wherein the request is from a first process executed by the processor, receiving a second request for processing to be performed on the programmable IC from a second and different process executed by the processor while the programmable IC still implements the first image, comparing a second image specified by the second request to the first image, and, in response to determining that the second image matches the first image based on the comparing, granting the second request for processing to be performed by the programmable IC.

In an aspect, the second request specifies a type of access. Accordingly, the processor is configured to initiate operations further including performing the granting in response to determining that the type of access is non-exclusive.

In another aspect, the second request specifies a type of access. Accordingly, the processor is configured to initiate operations further including performing the granting in response to determining that the type of access is exclusive and an accelerator implemented in the programmable IC and specified by the second request is idle.

In another aspect, the processor is configured to initiate operations further including receiving a third request for processing to be performed on the programmable IC from a third and different process executing in the host data processing system while the programmable IC still implements the first image, comparing a third image specified by the third request to the first image, and, in response to determining that the third image does not match the first image based on the comparing and that the programmable IC is not idle, rejecting the third request for processing to be performed by the programmable IC.

In another aspect, the processor is configured to initiate operations further including detecting that the second process has been terminated and, in response to the detecting, purging each request associated with the second process that has been queued in the host data processing system and not yet submitted to the programmable IC.

In another aspect, the processor is configured to initiate operations further including discarding results received from the programmable IC for any request associated with the second process.

In another aspect, the processor is configured to initiate operations further including, in response to determining that a request submitted by the second process has not finished after expiration of a specified time period, initiating reset of the programmable IC.

In another aspect, the processor is configured to initiate operations further including allocating a first region of RAM local to the programmable IC to the first process and allocating a second region of the RAM local to the programmable IC to the second process. The first region and the second region are allocated for an overlapping amount of time and are mutually exclusive regions in the local memory.

In another aspect, the processor is configured to initiate operations further including determining that a direct memory access channel on the programmable IC is available, allocating the available direct memory access channel to the second process, and transferring data for use by the second process to a region of RAM local to the programmable IC using the available direct memory access channel.

A computer program product includes a computer readable storage medium having program code stored thereon. The program code is executable by a processor to perform operations. The operations include implementing a first image within a programmable IC in response to a first request for processing to be performed by the programmable IC, wherein the request is from a first process executing in a host data processing system coupled to the programmable IC, receiving a second request for processing to be performed on the programmable IC from a second and different process executing in the host data processing system while the programmable IC still implements the first image, comparing a second image specified by the second request to the first image, and, in response to determining that the second image matches the first image based on the comparing, granting the second request for processing to be performed by the programmable IC.

In an aspect, the second request specifies a type of access. Accordingly, the program code is executable by the computer hardware to initiate operations further including performing the granting in response to determining that the type of access is non-exclusive or performing the granting in response to determining that the type of access is exclusive and an accelerator implemented in the programmable IC and specified by the second request is idle.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   implementing a first image within a programmable integrated circuit in response to a first request for processing to be performed by the programmable integrated circuit, wherein the first request is from a first process executing in a host data processing system coupled to the programmable integrated circuit;
   receiving, using a processor of the host data processing system, a second request for processing to be performed on the programmable integrated circuit from a second and different process executing in the host data processing system while the programmable integrated circuit still implements the first image, wherein the second request includes a plurality of arguments including a unique identifier for a second image;
   wherein the second image implements a plurality of accelerators, and the plurality of arguments include an accelerator index specifying a selected accelerator of the plurality of accelerators of the second image and a type of access to the selected accelerator requested by the second process;
   comparing, using the processor, the second image specified by the unique identifier of the second request to the first image implemented in the programmable integrated circuit; and
   in response to determining that the second image matches the first image based on the comparing such that the plurality of accelerators are implemented in the programmable integrated circuit by virtue of the first image, granting, using the processor, the second request for processing to be performed by the programmable integrated circuit based on a comparison of the type of access to the selected accelerator requested by the second process and a number of processes using the selected accelerator.

2. The method of claim 1, further comprising:
   performing the granting in response to determining that the type of access is non-exclusive.

3. The method of claim 1, further comprising:
   performing the granting in response to determining that the type of access is exclusive and the selected accelerator implemented in the programmable integrated circuit is idle.

4. The method of claim 1, further comprising:
   receiving a third request for processing to be performed on the programmable integrated circuit from a third and different process executing in the host data processing system while the programmable integrated circuit still implements the first image;
   comparing a third image specified by the third request to the first image; and
   in response to determining that the third image does not match the first image based on the comparing and that the programmable integrated circuit is not idle, rejecting the third request for processing to be performed by the programmable integrated circuit.

5. The method of claim 1, further comprising:
   detecting that the second process has been terminated; and
   in response to the detecting, purging each request associated with the second process that has been queued in the host data processing system and not yet submitted to the programmable integrated circuit.

6. The method of claim 5, further comprising:
   discarding results received from the programmable integrated circuit for any request associated with the second process.

7. The method of claim 5, further comprising:
   in response to determining that a granted request submitted by the second process has not finished after expiration of a specified time period, initiating reset of the programmable integrated circuit.

8. The method of claim 1, wherein the programmable integrated circuit is disposed on a hardware acceleration card having a random-access memory local to the programmable integrated circuit, the method further comprising:
   for each process that has at least one granted request to access the programmable integrated circuit, creating a buffer within the random-access memory to exchange data between the process and the and a corresponding accelerator in the programmable integrated circuit.

9. The method of claim 1, further comprising:
   determining that a direct memory access channel on the programmable integrated circuit is available;

allocating the available direct memory access channel to the second process; and transferring data for use by the second process to a region of random-access memory local to the programmable integrated circuit using the available direct memory access channel.

10. A system, comprising:

a processor configured to initiate operations including:

implementing a first image within a programmable integrated circuit in response to a first request for processing to be performed by the programmable integrated circuit, wherein the first request is from a first process executed by the processor;

receiving a second request for processing to be performed on the programmable integrated circuit from a second and different process executed by the processor while the programmable integrated circuit still implements the first image, wherein the second request includes a plurality of arguments including a unique identifier for a second image;

wherein the second image implements a plurality of accelerators, and the plurality of arguments include an accelerator index specifying a selected accelerator of the plurality of accelerators of the second image and a type of access to the selected accelerator requested by the second process;

comparing the second image specified by the unique identifier of the second request to the first image implemented in the programmable integrated circuit; and in response to determining that the second image matches the first image based on the comparing such that the plurality of accelerators are implemented in the programmable integrated circuit by virtue of the first image, granting the second request for processing to be performed by the programmable integrated circuit based on a comparison of the type of access to the selected accelerator requested by the second process and a number of processes using the selected accelerator.

11. The system of claim 10, wherein the processor is configured to initiate operations further comprising:

performing the granting in response to determining that the type of access is non-exclusive.

12. The system of claim 10, wherein the processor is configured to initiate operations further comprising:

performing the granting in response to determining that the type of access is exclusive and the selected accelerator implemented in the programmable integrated circuit is idle.

13. The system of claim 10, wherein the processor is configured to initiate operations further comprising:

receiving a third request for processing to be performed on the programmable integrated circuit from a third and different process executed by the processor while the programmable integrated circuit still implements the first image;

comparing a third image specified by the third request to the first image; and in response to determining that the third image does not match the first image based on the comparing and that the programmable integrated circuit is not idle, rejecting the third request for processing to be performed by the programmable integrated circuit.

14. The system of claim 10, wherein the processor is configured to initiate operations further comprising:

detecting that the second process has been terminated; and in response to the detecting, purging each request associated with the second process that has been queued in the system and not yet submitted to the programmable integrated circuit.

15. The system of claim 14, wherein the processor is configured to initiate operations further comprising:

discarding results received from the programmable integrated circuit for any request associated with the second process.

16. The system of claim 14, wherein the processor is configured to initiate operations further comprising:

in response to determining that a granted request submitted by the second process has not finished after expiration of a specified time period, initiating reset of the programmable integrated circuit.

17. The system of claim 10, wherein the programmable integrated circuit is disposed on a hardware acceleration card having a random-access memory local to the programmable integrated circuit, wherein the processor is configured to initiate operations further comprising:

for each process that has at least one granted request to access the programmable integrated circuit, creating a buffer within the random-access memory to exchange data between the process and a corresponding accelerator in the programmable integrated circuit.

18. The system of claim 10, wherein the processor is configured to initiate operations further comprising:

determining that a direct memory access channel on the programmable integrated circuit is available;

allocating the available direct memory access channel to the second process; and transferring data for use by the second process to a region of random-access memory local to the programmable integrated circuit using the available direct memory access channel.

19. A computer program product, comprising:

a computer readable storage medium having program code stored thereon, wherein the program code is executable by computer hardware to initiate operations including:

implementing a first image within a programmable integrated circuit in response to a first request for processing to be performed by the programmable integrated circuit, wherein the first request is from a first process executing in a host data processing system coupled to the programmable integrated circuit;

receiving a second request for processing to be performed on the programmable integrated circuit from a second and different process executing in the host data processing system while the programmable integrated circuit still implements the first image, wherein the second request includes a plurality of arguments including a unique identifier for a second image;

wherein the second image implements a plurality of accelerators, and the plurality of arguments include an accelerator index specifying a selected accelerator of the plurality of accelerators of the second image and a type of access to the selected accelerator requested by the second process;

comparing a second image specified by the unique identifier of the second request to the first image implemented in the programmable integrated circuit; and in response to determining that the second image matches the first image based on the comparing such that the plurality of accelerators are implemented in the programmable integrated circuit by virtue of the first image, granting the second request for processing to be performed by the programmable integrated circuit based on a comparison of the type of access to the selected accelerator requested by the second process and a number of processes using the selected accelerator.

20. The computer program product of claim 19, wherein the second request specifies a type of access, and wherein the program code is executable by the computer hardware to initiate operations further comprising:
   performing the granting in response to determining that the type of access is non-exclusive; or
   performing the granting in response to determining that the type of access is exclusive and the selected accelerator implemented in the programmable integrated circuit and specified by the second request is idle.

* * * * *

UNITED STATES PATENT AND TRADEMARK OFFICE
CERTIFICATE OF CORRECTION

PATENT NO. : 11,086,815 B1
APPLICATION NO. : 16/384624
DATED : August 10, 2021
INVENTOR(S) : Sonal Santan Page 1 of 1

It is certified that error appears in the above-identified patent and that said Letters Patent is hereby corrected as shown below:

In the Claims

In Column 24, Claim 8, Line (63), delete "and the" before --and a corresponding accelerator--, therefor.

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*